(12) United States Patent
Wei

(10) Patent No.: US 7,752,280 B2
(45) Date of Patent: Jul. 6, 2010

(54) METHOD OF DETECTING RESPONSE TIME-OUT BASED ON MASTER-SLAVE PROTOCOL

(75) Inventor: Bo-Er Wei, Taipei (TW)

(73) Assignee: MOXA Inc., Shing-Tien (TW)

( * ) Notice: Subject to any disclaimer, the term of this patent is extended or adjusted under 35 U.S.C. 154(b) by 0 days.

(21) Appl. No.: 11/689,515

(22) Filed: Mar. 22, 2007

(65) Prior Publication Data
US 2008/0235346 A1   Sep. 25, 2008

(51) Int. Cl.
*G06F 15/16* (2006.01)
*G06F 15/173* (2006.01)
*G06F 13/00* (2006.01)
(52) U.S. Cl. .................... 709/208; 709/224; 710/110
(58) Field of Classification Search ......... 710/110–112, 710/240–244, 104–105, 306–308; 709/208, 709/224
See application file for complete search history.

(56) References Cited

U.S. PATENT DOCUMENTS 6,233,626 B1 *   5/2001   Swales et al. ................. 710/11
6,792,459 B2 *   9/2004   Elnozahy et al. ............ 709/224

OTHER PUBLICATIONS

Modicon, Jun. 1996, Modicon, Inc., Industrial Automation System, Modicon, Inc, Rev. J, Modbus Protocol Reference Guide, pp. 6-7, 22, 74 and 76.*
Modbus.org, Dec. 28, 2006, Modbus-IDA, V1.1b, MODBUS Application Protocol Specification, Fig. 2, sections 2-3 and 6.8.*

* cited by examiner

*Primary Examiner*—Peling A Shaw
(74) *Attorney, Agent, or Firm*—Bacon & Thomas, PLLC

(57) ABSTRACT

A method of detecting response time-out based on master-slave protocol architecture, which calculates the time required for a slave device to respond to a Modbus request sent by a detection device based on Modbus communication protocol. The method is to send a Modbus request to the slave device through a detection device, and to record the Modbus request sent time, and then to have the slave device provide to the detection device a response. The detection device calculates the response time-out based on the request sent time and the response received time By means of calculating the precise response time-out from the response time-outs which are gotten from the slave device respond to a predetermined number of Modbus requests, the user or manager can determine the response time-out required for the slave device precisely so as to give EXECUTE instruction or command at the accurate time point.

19 Claims, 7 Drawing Sheets

| Slave address | Function code | Data | CRC |
|---|---|---|---|
| 1 byte | 1 byte | 0 up to 252 bytes | 2 bytes |

*FIG. 4*

| Start char | Slave address | Function code | Data | LRC | End chars |
|---|---|---|---|---|---|
| 1 char | 2 chars | 2 chars | 0 up to 504 chars | 2 chars | 2 chars |

*FIG. 4A*

METHOD OF DETECTING RESPONSE TIME-OUT BASED ON MASTER-SLAVE PROTOCOL

BACKGROUND OF THE INVENTION

1. Field of the Invention

The present invention relates to a method of detecting response time-out based on master-slave protocol architecture. By means of calculating the precise response time-out from response time-outs which are gotten from the slave device respond to a predetermined number of Modbus requests and then applying the precise response time-out to the formal master/slave communication time period, the master device can give EXECUTE instruction or command at the accurate time point.

2. Description of the Related Art

Following fast development of communication technology, communication networks have also been well developed. LAN (Local Area Network) and WAN (Wide Area Network) are categorized subject to their scope and scale. A LAN connects network devices over a relatively short distance. A WAN is a geographically-dispersed collection of LANs. The Internet is the largest WAN, spanning the Earth.

Either in LAN or WAN, Ethernet has proven itself as a relatively inexpensive, reasonably fast, and very popular LAN technology. Ethernet cables (fiber optics or twisted pair) are limited in their reach, and these distances are insufficient to cover medium-sized and large network installations. Therefore, repeaters are used in Ethernets. A repeater in Ethernet networking is a device that allows multiple cables to be joined and greater distances to be spanned. A bridge device can join an Ethernet to another network of a different type, such as a wireless network. Popular types of repeater devices are Ethernet hubs, switches and routers. By means of the combination of Ethernet cables with hubs, switches and/or routers, an Ethernet networking allows transmission or control of data or instructions among different LANs, computers, and/or other devices such as surveillance systems, security systems, automation systems, etc.

Further, there is known a network communication architecture commonly seen in industrial control and device communication protocol or rules, i.e., Modbus. Modbus is a serial communications protocol published by Modicon in 1979 for use with its programmable logic controllers (PLCs). It has become a standard communications protocol in industry, and is now the most commonly available means of connecting industrial electronic devices. The first main reason for the extensive use of Modbus over other communications protocols is that Modbus is openly published and royalty-free. The second main reason is that Modbus can be implemented in days, not months. Modbus moving raw bits or words without placing many restrictions on vendors is the third main reason.

However, because Modbus is a master/slave protocol, the master device must poll the slave devices one by one but cannot bi-directionally communication with all the slave devices at a same time. Further, every slave device connected to the master device has a unique address for allowing accurate communication with the master device. Either the other slave devices have received the instruction or request from the master device or have not received any instructions or requests, only the slave device to be in communication with the master device will process the instruction or request given by the master device.

Because Modbus is a master/slave protocol and because the master device must poll the slave devices one by one, it is important to know accurately the response time-out when the master device gives a request to the slave device. Currently slave response time-out is measured by the user's rule of experience, or trial and error. However, this nonprecise verification method tends to obtain an inaccurate response time-out. Further, manual verification is time consuming and costly. Setting of improper response time-out may cause the system unable to function. For example, in a regular industrial manufacturing line (such as wafer plant, plastic materials plant), if the slave device cannot give the instruction on accurate time due to that the response time-out required for the slave device is not accurately obtained, or if the slave device cannot execute the master device's command at accurate time point, an abnormality or interruption of the manufacturing line may occur, resulting in paralysis or damage of the machinery of the industrial manufacturing line. Further, the temperature control, emergency exit system and other control actions in a building control need to make an accurate response at accurate time point. If responding tactics cannot be started at accurate time point, it will get no help in reducing the risk of disaster and the loss resulted from such disaster.

Therefore, it is desirable to provide a method of detecting master/slave response time-out under master-slave communications architecture that eliminates the aforesaid problem.

SUMMARY OF THE INVENTION

The present invention has been accomplished under the circumstances in view. It is the main object of the present invention to provide a method of detecting master/slave response time-out based on master-slave protocol architecture, which enables the main control center or manager to start the related emergency measures, for example, to start the auto control system of a building at the accurate time point. By means of calculate the accurate response time-out of the slave device, the main control center or manager can give the request to start the related emergency measures at an accurate time, thereby lowering the chance of disaster and the loss from any disaster, and also helping evacuation of people from a disaster. By means of calculating the accurate master/slave response time-out, the present invention eliminates the risk of inaccurate response time-out obtained subject to the user's rule of experience or by means of trial and error.

It is another object of the present invention to provide a method of detecting response time-out based on master-slave protocol architecture, which uses different functions: such as using functions of maximum, minimum or average on slave device response time-outs and further may plus a time delay, enabling the user to make an accurate setting for a specific industry or technical field, therefore the invention eliminates the risk of inaccurate response time-out obtained subject to the user's rule of experience or by means of trial and error.

It is still another object of the present invention to provide a method of detecting response time-out based on master-slave protocol architecture, which calculates the time required for the slave device to respond to a Modbus request subject to Modbus protocol. The method of the present invention is compliant to Modbus communications protocol. The invention can obtain the precise response time-out without extra hardware devices or elements after installation or setting of a software.

To achieve these and other objects of the present invention, the method of detecting response time-out based on master-slave protocol architecture comprises the steps of: (a) a detection device sends a MODUS request to the slave device, and records the request sent time; (b) the slave device receives the Modbus request sent by the detection device, and send back a response; (c) the detection device receives the response from the slave device and records the response received time; (d) calculate the response time-out based on the request sent time and the response received time, and repeat steps (a) through (d) a predetermined number of times; (e) calculate the precise response time-out after the slave device has responded to a predetermined number of Modbus requests.

BRIEF DESCRIPTION OF THE DRAWINGS

FIG. 4 illustrates a Modbus RTU protocol standard packet format according to the present invention.

FIG. 4A is a Modbus ASCII protocol standard packet format according to the present invention.

DETAILED DESCRIPTION OF THE PREFERRED EMBODIMENT

For easy and fully understanding of the present invention, this specification describes the configurations of Modbus RTU and ASCII architecture at first, and then the technical details by means of flowcharts and operation equations.

From the aforesaid prior art technique, we know that Modbus is a master/slave communication protocol. In one same network, Modbus allows for connection of different slave devices to one master device. Further, Modbus includes two standards. The first standard is Modbus RTU (Remote Terminal Unit) which uses binary data of messages. The second standard is Modbus ASCII standard that shows data in the form easily readable to human beings but messages are longer than messages of Modbus RTU. The Modbus RTU standard and the Modbus ASCII standard both have the common features of serial transmission and allowing for transmission of only one request from the master device to the slave device at one same time point before the slave device responds it. Details about Modbus RTU/ASCII standards will be described further.

Figure 1:
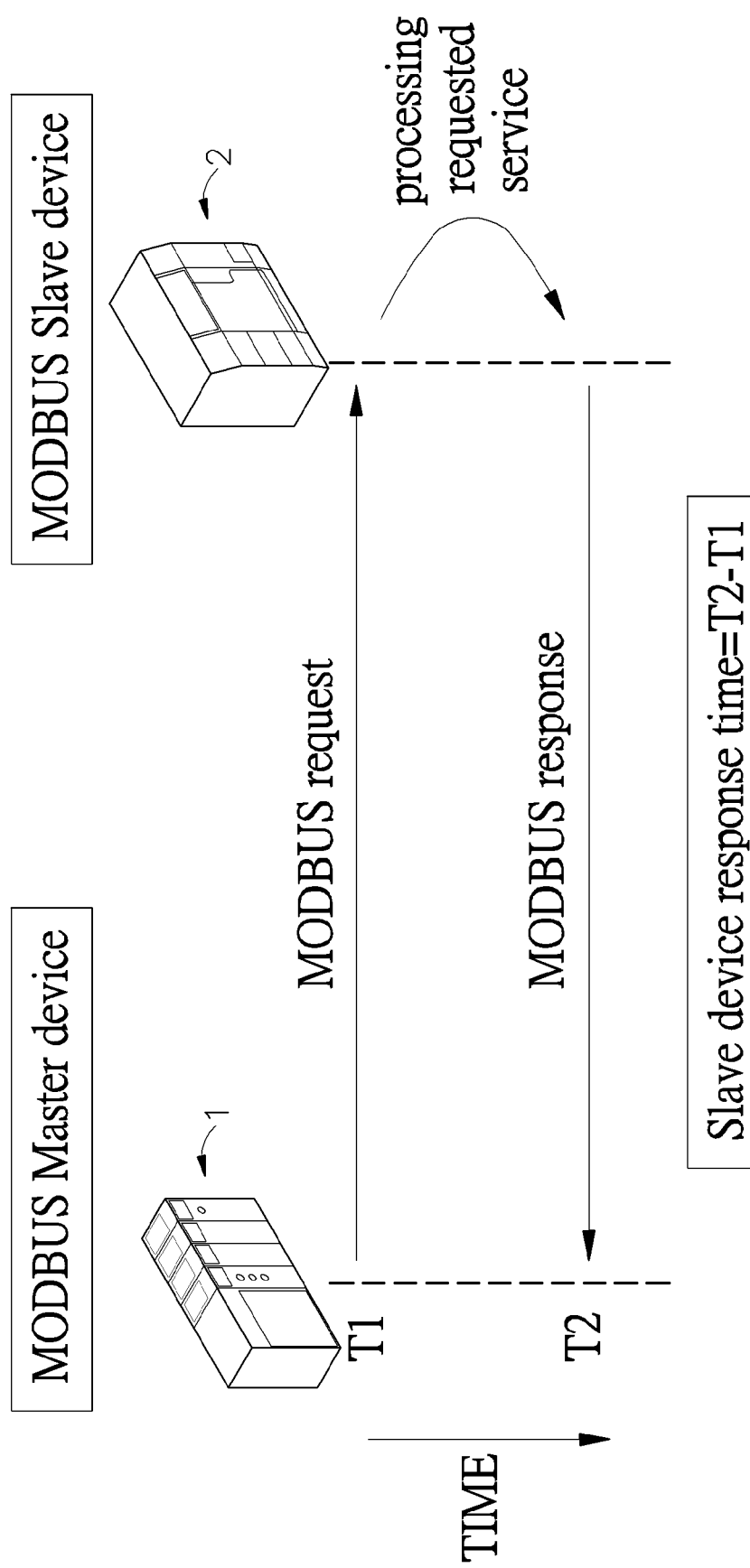
FIG. 1 is a schematic drawing illustrating response time under the Modbus RTU/ASCII communication protocol architecture according to the preferred embodiment of the present invention.
Figure 2:
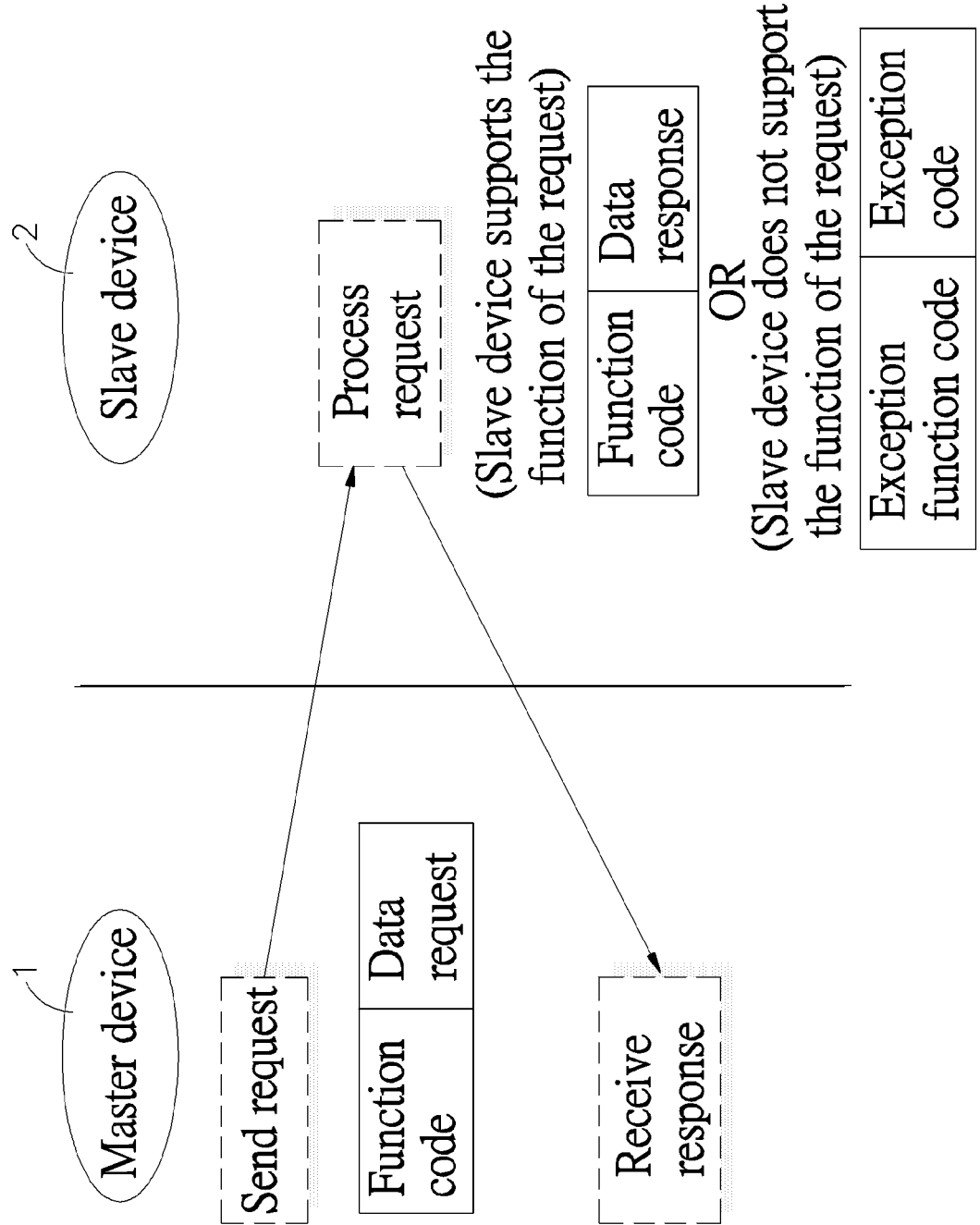
FIG. 2 is a schematic drawing illustrating a communication under the Modbus RTU/ASCII communication protocol architecture according to the preferred embodiment of the present invention.

FIG. 1 is a schematic drawing illustrating response time under the Modbus RTU/ASCII communication protocol architecture according to the preferred embodiment of the present invention. FIG. 2 is a schematic drawing illustrating a communication under the Modbus RTU/ASCII communication protocol architecture according to the preferred embodiment of the present invention. As illustrated, a slave device 2 is connected to a master device 1 under the Modbus RTU/ASCII communication protocol architecture. The master-slave interaction allows the master device 1 send a request to the slave device 2. The request includes Function code and Data request. If the slave device 2 supports the function of the request, the slave device 2 gives a response including Function code and Data to the master device 1 after receiving and executing the request. On the contrary, if the slave device 2 does not support the function of the request, the slave device 2 gives a response including Exception function code and Exception code to the master device 1 after receiving the request.

Figure 3:
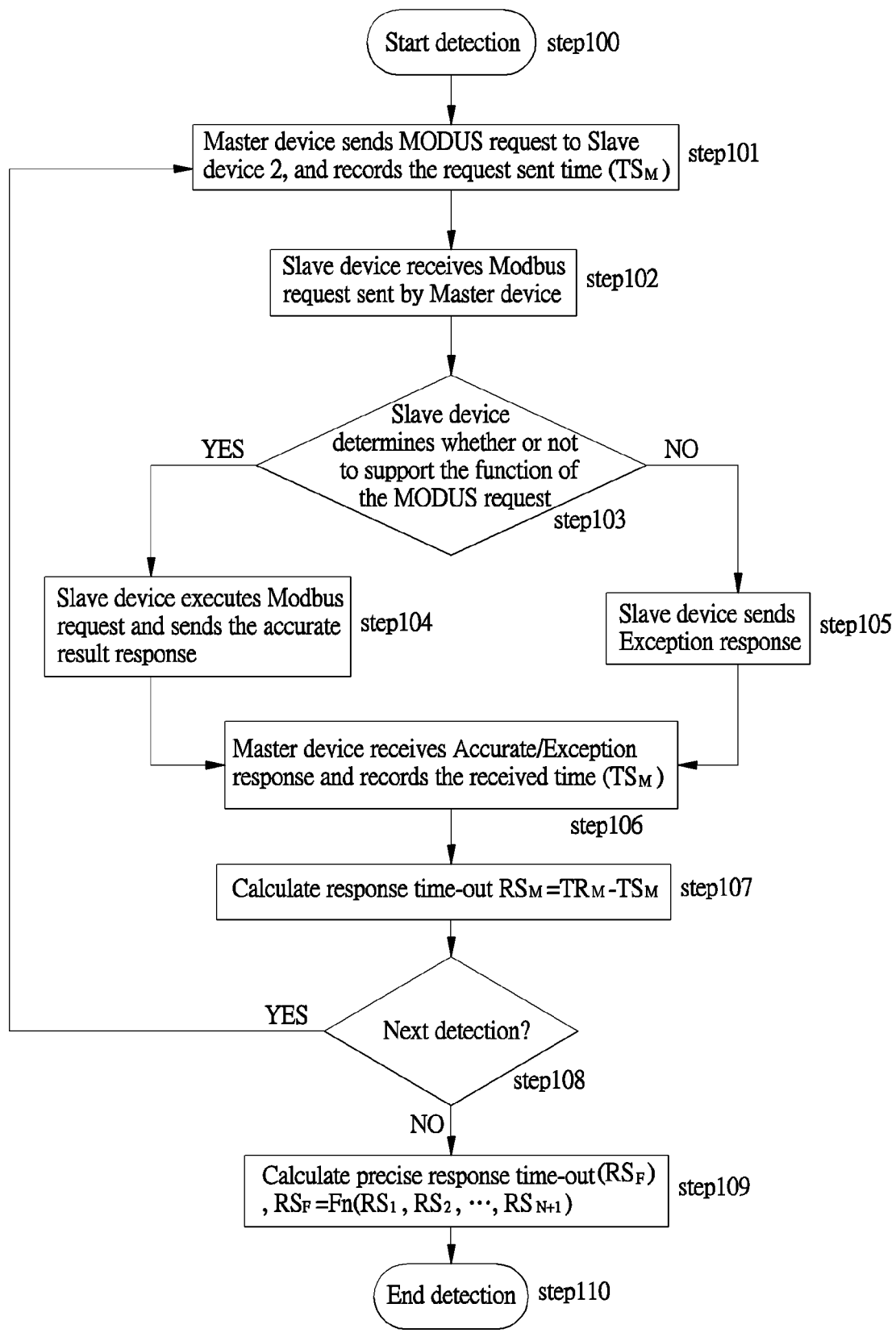
FIG. 3 is the flowchart of precise response time-out detection under Modbus RTU/ASCII communication protocol architecture according to the preferred embodiment of the present invention.

FIG. 3 is the flowchart of precise response time-out detection under Modbus RTU/ASCII communication protocol architecture according to the preferred embodiment of the present invention. Referring to FIG. 3 and FIGS. 1 and 2 again, the response time-out detection under Modbus RTU/ASCII communication protocol includes the steps of:

(100) Start detection;

(101) Master device 1 sends a MODUS request to Slave device 2, and records the request sent time ($TS_M$);

(102) Slave device 2 receives the Modbus request sent by Master device 1;

(103) Slave device 2 determines whether or not to support the function of the MODUS request, and then proceeds to step (104) if yes, or step (105) if not;

(104) Slave device 2 executes the Modbus request and sends the accurate result response, and then proceeds to step (106);

(105) Slave device 2 sends Exception response and then proceeds to step (106);

(106) Master device 1 receives Accurate/Exception response and records the received time ($TR_M$);

(107) Calculate response time-out $RS_M = TR_M - TS_M$;

(108) Determine whether or not to run a next detection and then return to step (101) if yes, or proceeds to step (109) if not;

(109) Calculate accurate response time-out ($RS_F$), $RS_F$=Fn ($RS_1, RS_2, \ldots, RS_{N+1}$);

(110) End the detection.

In a world, the invention is, at first, to have the master device 1 send a Modbus request to the slave device 2 to be detected and record the request sent time ($TS_1$). Thereafter, the master device 1 receives a response from the slave device 2, and then records the response received time ($TR_1$) and then calculates the response time-out: $RS_1 = TR_1 - TS_1$. Thereafter, repeat the aforesaid steps N times to obtain every response received time $TS_{N+1}$ and $TR_{N+1}$, and calculate every response time-out $RS_{N+1}$. At final, $RS_1, RS_2, \ldots, RS_{N+1}$ thus obtained are put in a predefined function Fn ($RS_1, RS_2, \ldots, RS_{N+1}$) for calculation to obtain the desired precise response time-out $RS_F$. In actual practice, the function used in the method of detecting master/slave response time-out under master-slave communications architecture can be calculated subject to the average response time-out plus a time delay, and therefore the function Fn( ) can be:

$$RS_F = Fn(RS_1, RS_2, \ldots, RS_{N+1})$$

$$= \frac{\sum_{M=1}^{N+1} RS_M}{(N+1)} + T_{OFFSET}$$

Further, the function used in the method of detecting master/slave response time-out under master-slave communications architecture also can be calculated subject to the maximum response time-out plus a time delay, and therefore the function Fn( ) can be:

$$RS_F = Fn(RS_1, RS_2, \ldots, RS_{N+1})$$
$$= \text{MAX}(RS_1, RS_2, \ldots, RS_{N+1}) + T_{OFFSET}.$$

The aforesaid Modbus requests are requests in Modbus RTU/ASCII protocol standard packet format. FIG. 4 illustrates a Modbus RTU protocol standard packet format according to the present invention. FIG. 4A illustrates a Modbus ASCII protocol standard packet format according to the present invention. The major difference between Modbus RTU protocol standard packet format and Modbus ASCII protocol standard packet format is their coding method.

When using ASCII each hexadecimal character in the modbus message is sent as one ASCII character that is then turned into binary. Therefore 1 Modbus character=1 ASCII character=10 bits (1 start 7 data 1 parity 1 stop). ASCII uses 3 characters to delimit the message as follows: Start of message:End of message CRLF. ASCII uses a longitudinal redundancy check (LRC) as the checksum. The checksum is calculated after the message is converted to binary. When using RTU each character in the modbus message is sent as four bits. Therefore 2 modbus character=1 packet=11 bits (1 start 8 data 1 parity 1 stop). RTU uses 3.5 characters spaces (or silences) to delimit the message. Because of this delimiting of the message any delays in the transmission medium will cause the message to be misinterpreted by the receiving device. Therefore RTU is not well suited for modem communications. RTU uses a cyclical redundancy check (CRC) as the checksum. The checksum is calculated after the message is converted to binary. Both RTU and ASCII have the same transmission mode in serial communications. Therefore, both RTU and ASCII can use the aforesaid method to detect response time-out. Further, the invention does not limit the function code and data contained in RTU/ASCII. To prevent interference with the operation of the slave device during detection, the Modbus request can be return quey data (function code 0x08, sub-function code 0x00), read coils (function code 0x01), read discrete inputs (function code 0x02), read holding registers (function coce 0x03), read input register (function code 0x04), or any function code set by the user.

Figure 5:
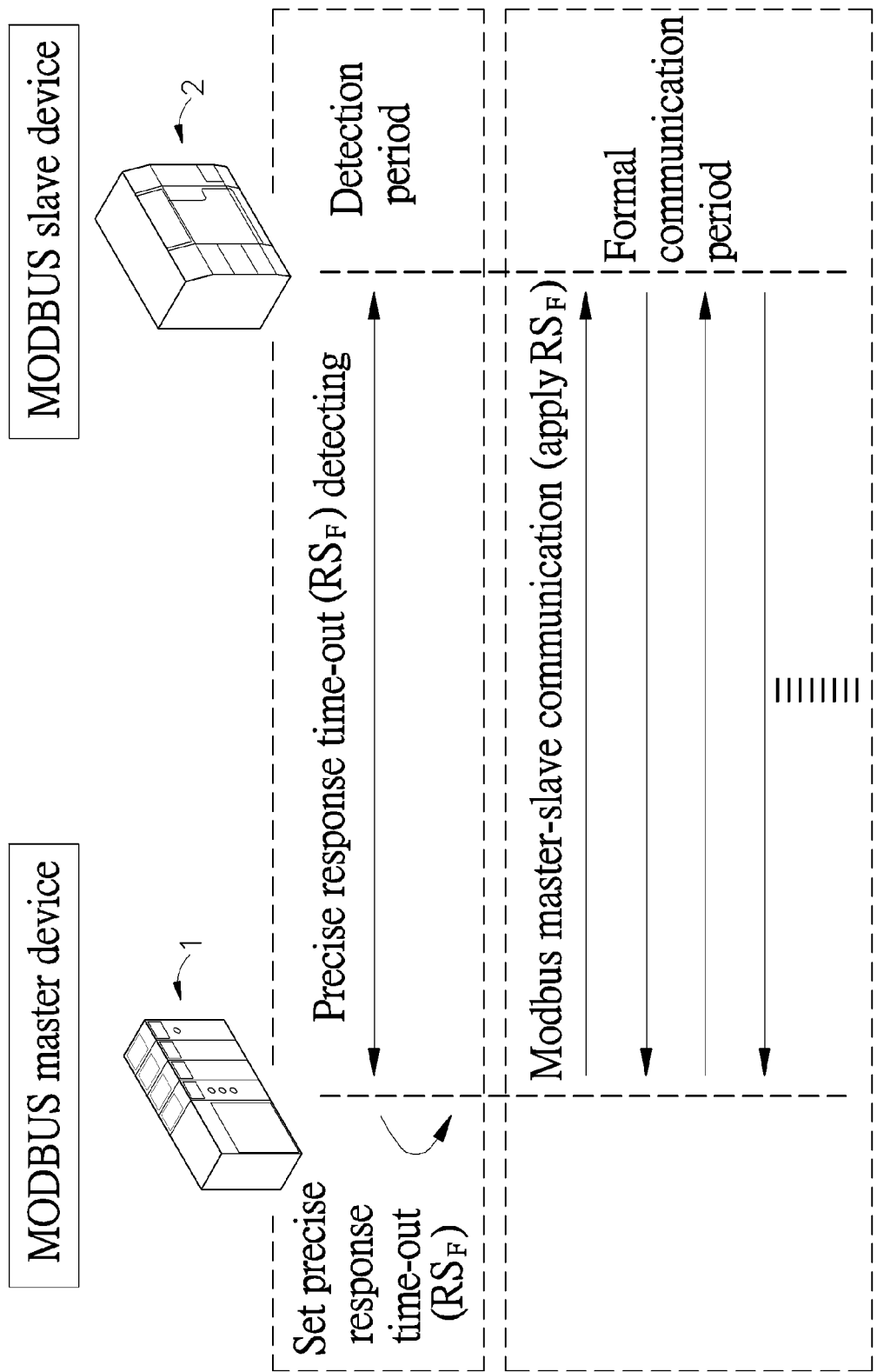
FIG. 5 is a schematic drawing illustrating an application of detection of slave device response time-out to a Modbus master device according to the present invention.
Figure 6:
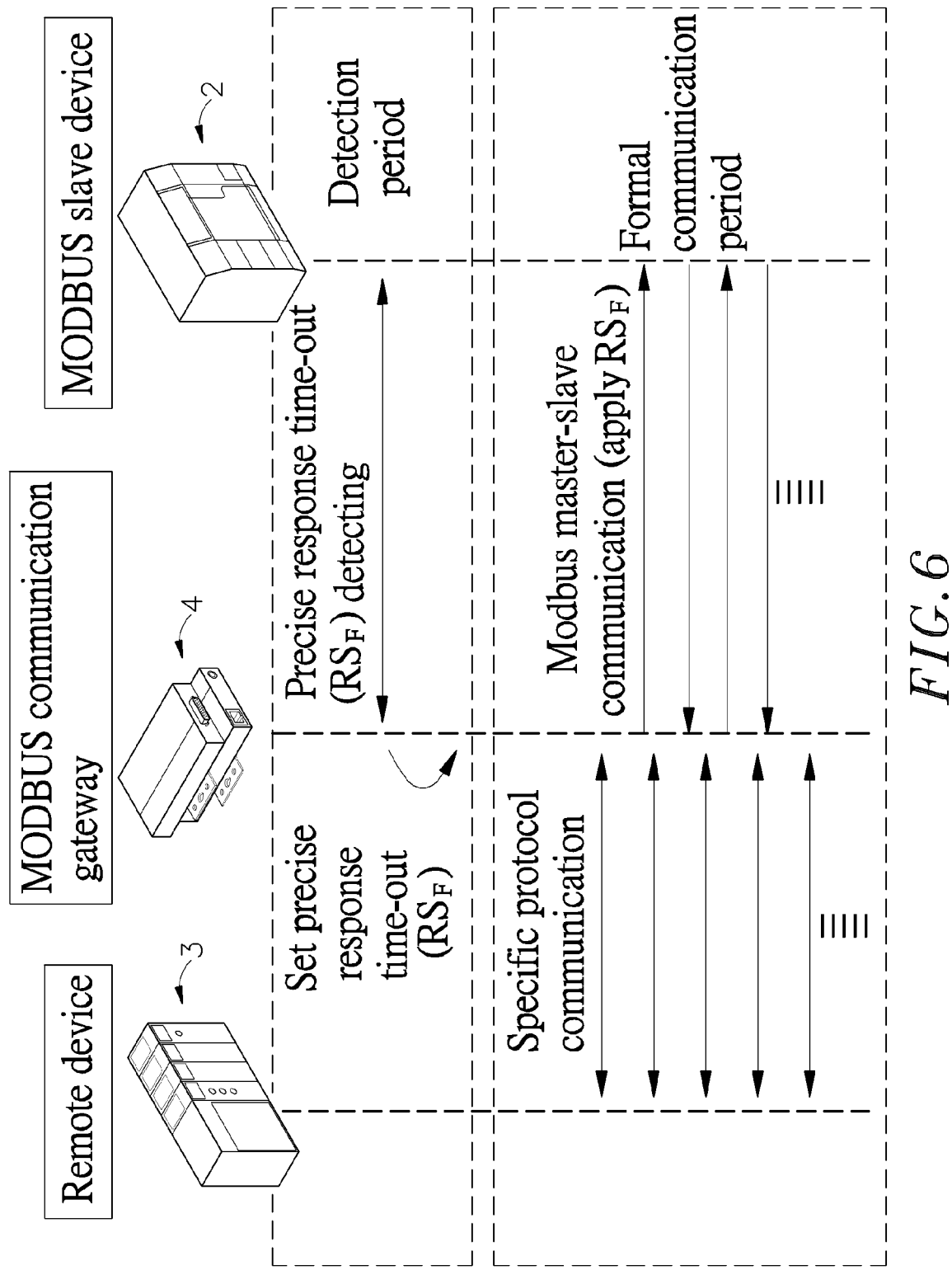
FIG. 6 is a schematic drawing illustrating an application of detection of slave device response time-out to a Modbus communication gateway according to the present invention.

FIG. 5 is a schematic drawing illustrating an application of detection of slave device response time-out to a Modbus master device according to the present invention. Subject to the aforesaid technical content and method of the present invention, the master device 1 can use the precise response time-out $RS_F$ obtained during the detection time period in the formal communication time period, i.e., the time period in which the master device 1 and the slave device 2 are started to transmit data or request. During this formal communication time period, the master device 1 can use the precise response time-out $RS_F$ to determine at which time point to obtain the response time-out from the slave device 2 accurately. Thus, the master device 1 needs not to obtain a raw response time-out by means of conventional rule of experience, or trial and error FIG. 6 is a schematic drawing illustrating an application of detection of slave device response time-out to a Modbus communication gateway according to the present invention. As illustrated, a slave device 2 and a remote device 3 are respectively connected to a Modbus communication gateway 4. After the precise response-time out $RS_F$ of the Modbus communication gateway 4 and the slave device 2 has been obtained subject to the aforesaid method and set the precise response time-out $RS_F$ on the Modbus communication gateway 4, this precise response time-out $RS_F$ can be applied to the formal communication among the remote device 3, the Modbus communication gateway 4 and the slave device 2. During interaction among the remote device 3, the Modbus communication gateway 4 and the slave device 2, the Modbus communication gateway 4 can use the precise response time-out $RS_F$ to determine at which time point to obtain the response time-out from the slave device 2 or to act with the remote device 3.

The above description is simply an example of the present invention. During actual practice, the master device can be a Modbus communication gateway, detection device, repeater, or any of a variety of other electronic devices capable of sending a test request. Further, the request sent by the master device 1 can be: read holding register, return query data, or the like. Further, the operating function used in the aforesaid description can be the calculation of the average time, maximum time, shortest time, or any of the times plus a time delay.

Therefore, when compared to the prior art techniques, the present invention shows the following advantages:

1. In regular building automation applications, proximal/remote or master/slave concept is adopted. All events management and emergency handlings are connected to the computer in the main control room through a transmission interface. When a condition happens, a person in the main control room or the computer issues a request to an external input/output device to execute a specific action, for example, turning on the radiation fan when the temperature is excessively high, turning on the alarm lamp when the exist door is abnormally opened, starting the automatic sprinkling system when the temperature surpasses a predetermined fire temperature, etc. Because the trigging time of these actions is critical, the main control terminal or the manager must give the necessary request to start the related control means at the accurate triggering time. By means of calculating the accurate slave device response time-out, the main control terminal or manager can give the request to the slave device at the accurate time point, i.e., the invention prevents the master device from sending out a triggering request to trigger the related facility early or at a late time, thereby lowering the chance of disaster and the loss from any disaster, and effectively helping evacuation of people from a disaster. Therefore, the invention eliminates the risk of inaccurate response time-out obtained subject to the user's rule of experience or by means of trial and error.

2. Conventionally, Modbus slave device response time-out is obtained subject to the user's rule of experience or by means of trial and error. The Modbus slave device response time-out obtained subject to the user's rule of experience or by means of trial and error is not precise. Setting inaccurate response time-out may result in a system operation obstruction. In an industrial manufacturing line (for example, a wafer plant or plastic materials plant), if the master device cannot transmit a control request to the slave device or the slave device cannot execute the request from the master device at the accurate time point, the manufacturing line may be interrupted or an abnormal condition may occur in the manufacturing line, thereby resulting in paralysis or damage of the machinery of the industrial manufacturing line. Therefore, by means of calculating the precise master/slave response time-out ($RS_F$) and using it in the formal system communication time period, the master device can determine the triggering time point accurately, preventing a delay of trigging time.

3. The invention uses different functional functions, such as using functions of maximum, minimum or average on slave device response time-outs and further may plus a time delay, for enabling the user to make an accurate setting for a specific industry or technical field, and therefore the invention eliminates the risk of inaccurate response time-out obtained subject to the user's rule of experience or by means of trial and error.

4. Following alternation of generations, Modbus protocol has become a communication standard in industry. Modbus protocol architecture devices have been intensively used for connection between industrial electronic devices. The method of the present invention is compliant to Modbus communications protocol. The invention can obtain the precise response time-out without extra hardware devices or elements after installation or setting of a software.

5. The invention directly uses the requests under Modbus protocol standards and needs not to define other proprietary requests. Therefore, the requests used do not affect the normal functioning of the slave device. Further, either using the Modbus master device or Modbus communication gateway to transmit external requests, the slave response time-out can be measured through a software. Therefore, the user needs not to set the slave device response time-out manually, preventing a system operation problem due to inaccurate response time-out that may affect the client's confidence in the reliability of the product, causing the client to reject the product.

Although a particular embodiment of the invention has been described in detail for purposes of illustration, various modifications and enhancements may be made without departing from the spirit and scope of the invention.

What the invention claimed is:

1. A response time-out detection method based on master-slave protocol architecture, which calculates the time required for a detection device functioning as a Modbus master to receive a response from a slave device in response to a Modbus request sent by the detection device based on Modbus communication protocol, the method comprising the steps of:
   (a) start detection;
   (b) said detection device sends a Modbus return query data function and subfunction code to said slave device, and records a request sent time;
   (c) said slave device receives the Modbus return query data function and subfunction code sent by said detection device;
   (d) said slave device determines whether or not to support the return query data function, and then proceeds to step (e) if yes, or step (f) if not;
   (e) said slave device executes the return query data function and sends an accurate result response, and then proceeds to step (g);
   (f) said slave device sends an exception response and then proceeds to step (g);
   (g) said detection device receives the accurate/exception response from said slave device and records a response received time;
   (h) calculate the response time-out based on said request sent time and said response received time;
   (i) determine whether or not to run a next detection and return to step (b) if yes, or proceed to step (j) if not;
   (j) calculate the precise response time-out from said response time-outs which are gotten from said slave device in response to a predetermined number of the Modbus requests; and
   (k) end the detection;
   wherein said master-slave communications architecture is one of Modbus RTU and Modbus ASCII.

2. The response time-out detection method based on master-slave protocol architecture as claimed in claim 1, wherein the calculation of the precise responding time is done by obtaining one of the average time, maximum time and shortest time of the response time-out by means of a function.

3. The response time-out detection method based on master-slave protocol architecture as claimed in claim 2, wherein the calculation of said precise response time-out includes the step of adding a time delay.

4. The response time-out detection method based on master-slave protocol architecture as claimed in claim 1, wherein the calculation of the response time-out is done by means of the equation of $RS_M = TR_M - TS_M$, in which $RS_M$ is the respond time-out; $TR_M$ is the time point at which said detection device received the respond from said slave device; $TS_M$ is the time point at which said detection device sent the request to said slave device.

5. The response time-out detection method based on master-slave protocol architecture as claimed in claim 2, wherein obtaining the average time for the precise response time-out is done by means of a calculation through the equation of:

$$RS_F = Fn(RS_1, RS_2, \ldots, RS_{N+1}) = \frac{\sum_{M=1}^{N+1} RS_M}{(N+1)},$$

in which: Fn ( ) is a function; $RS_F$ is the precise response time-out of said slave device; $RS_1, \ldots, RS_{N+1}$ are response time-out during the period.

6. The response time-out detection method based on master-slave protocol architecture as claimed in claim 2, wherein obtaining the maximum time of the precise response time-out is done by means of a calculation through the equation of:

$$RS_F = Fn(RS_1, RS_2, \ldots, RS_{N+1})$$
$$= MAX(RS_1, RS_2, \ldots, RS_{N+1}),$$

in which: Fn ( ) is a function; $RS_F$ is the precise response time-out of said slave device; $RS_1, RS_2, \ldots, RS_{N+1}$ are response time-out during the period.

7. The response time-out detection method based on master-slave protocol architecture as claimed in claim 1, wherein said precise response time-out is applicable to the formal communication period between said master device and said slave device.

8. The response time-out detection method based on master-slave protocol architecture as claimed in claim 1, wherein said precise response time-out is applicable to the formal communication time period among a communication gateway, said slave device, and a remote device.

9. The response time-out detection method based on master-slave protocol architecture as claimed in claim 1, wherein said detection device is one of a Modbus master device, a Modbus communication gateway, and an independent device having detection device function.

10. A response time-out detection method based on master-slave protocol architecture, which calculates the time required for a detection device functioning as a Modbus master to receive a response from a slave device in response to a Modbus request sent by the detection device based on Modbus communication protocol, the method comprising the step of:

(a) start detection;
(b) said detection device sends a Modbus read function code to said slave device, and records a request sent time;
(c) said slave device receives the Modbus read function code sent by said detection device;
(d) said slave device determines whether or not to support the read function, and then proceeds to step (e) if yes, or step (f) if not;
(e) said slave device executes the read function and sends an accurate result response, and then proceeds to step (g);
(f) said slave device sends a exception response and then proceeds to step (g);
(g) said detection device receives the accurate/exception response from said slave device and records the received time;
(h) calculate the response time-out based on said request sent time and said response received time;
(i) determine whether or not to run a next detection and return to step (b) if yes, or proceeds to step (j) if not;
(j) calculate the precise response time-out from said response time-outs which are gotten from said salve device in response to a predetermined number of the MODBUS requests; and
(k) end the detection;
wherein said master-slave communications architecture is one of Modbus RTU and Modbus ASCII.

11. The response time-out detection method based on master-slave protocol architecture as claimed in claim 10, wherein the calculation of the precise responding time is done by obtaining one of the average time, maximum time and shortest time of the response time-out by means of a function.

12. The response time-out detection method based on master-slave protocol architecture as claimed in claim 11, wherein the calculation of said precise response time-out includes the step of adding a time delay.

13. The response time-out detection method based on master-slave protocol architecture as claimed in claim 10, wherein the calculation of the response time-out is done by means of the equation of $RS_M = TR_M - TS_M$, in which $RS_M$ is the respond time-out; $TR_M$ is the time point at which said detection device received the response from said slave device; $TS_M$ is the time point at which said detection device sent the request to said slave device.

14. The response time-out detection method based on master-slave protocol architecture as claimed in claim 11, wherein obtaining the average time for the precise response time-out is done by means of a calculation through the equation of:

$$RS_F = Fn(RS_1, RS_2, \ldots, RS_{N+1}) = \frac{\sum_{M=1}^{N+1} RS_M}{(N+1)},$$

in which: Fn ( ) is a function; $RS_F$ is the precise response time-out of said slave device; $RS_1, \ldots, RS_{N+1}$ are response time-out during the period.

15. The response time-out detection method based on master-slave protocol architecture as claimed in claim 11, wherein obtaining the maximum time of the precise response time-out is done by means of a calculation through the equation of:

$$RS_F = Fn(RS_1, RS_2, \ldots, RS_{N+1})$$
$$= MAX(RS_1, RS_2, \ldots, RS_{N+1}),$$

in which: Fn ( ) is a function; $RS_F$ is the precise response time-out of said slave device; $RS_1, RS_2, \ldots, RS_{N+1}$ are response time-out during the period.

16. The response time-out detection method based on master-slave protocol architecture as claimed in claim 10, wherein said precise response time-out is applicable to the formal communication period between said master device and said slave device.

17. The response time-out detection method based on master-slave protocol architecture as claimed in claim 10, wherein said precise response time-out is applicable to the formal communication time period among a communication gateway, said slave device, and a remote device.

18. The response time-out detection method based on master-slave protocol architecture as claimed in claim 10, wherein said detection device is one of Modbus master device, Modbus communication gateway, and independent device having detection device function.

19. The response time-out detection method based on master-slave protocol architecture as claimed in claim 10, wherein said read function code is one of a read coils function code, a read discrete inputs function code, a read holding registers function code, and a read input register function code.

* * * * *